United States Patent [19]  
Chayet

[11] 4,010,734  
[45] Mar. 8, 1977

[54] CLOSED SYSTEM SOLAR HEATER
[75] Inventor: Emil L. Chayet, Largo, Fla.
[73] Assignee: Solar Energy Dynamics Corporation, Tampa, Fla.
[22] Filed: Mar. 10, 1976
[21] Appl. No.: 665,648
[52] U.S. Cl. .............................. 126/271; 165/107; 237/1 A
[51] Int. Cl.² .......................................... F24J 3/02
[58] Field of Search ........... 126/270, 271; 237/1 A, 237/59; 165/107

[56] References Cited
UNITED STATES PATENTS

| | | | |
|---|---|---|---|
| 2,838,043 | 6/1958 | Bliss, Jr. | 126/271 |
| 3,236,294 | 2/1966 | Thomason | 126/271 |
| 3,799,145 | 3/1974 | Butterfield | 126/271 |

Primary Examiner—Kenneth W. Sprague  
Assistant Examiner—James C. Yeung  
Attorney, Agent, or Firm—Pollock, Vande Sande & Priddy

[57] ABSTRACT

A solar heating system of the closed type comprises a solar collector, a water storage tank, and water lines therebetween. The solar collector preferably comprises a continuous length of tubing coiled in a helical array of closely adjacent turns, having a water inlet communicating with the outermost turn and a water outlet communicating with the innermost turn. Comparatively cold water is taken from a water outlet adjacent the bottom of the storage tank and is pumped through a line to the water inlet of the solar collector, and heated water is supplied from the solar collector water outlet, together with cold water from an external supply, to a common inlet adjacent the top of the storage tank. The water line between the solar collector water outlet and the tank water inlet includes a U-shaped section disposed external of the tank and having legs at least equal to the height of the tank, to provide a heat trap which minimizes the loss of heat from the tank.

10 Claims, 1 Drawing Figure

U.S. Patent        Mar. 8, 1977        4,010,734
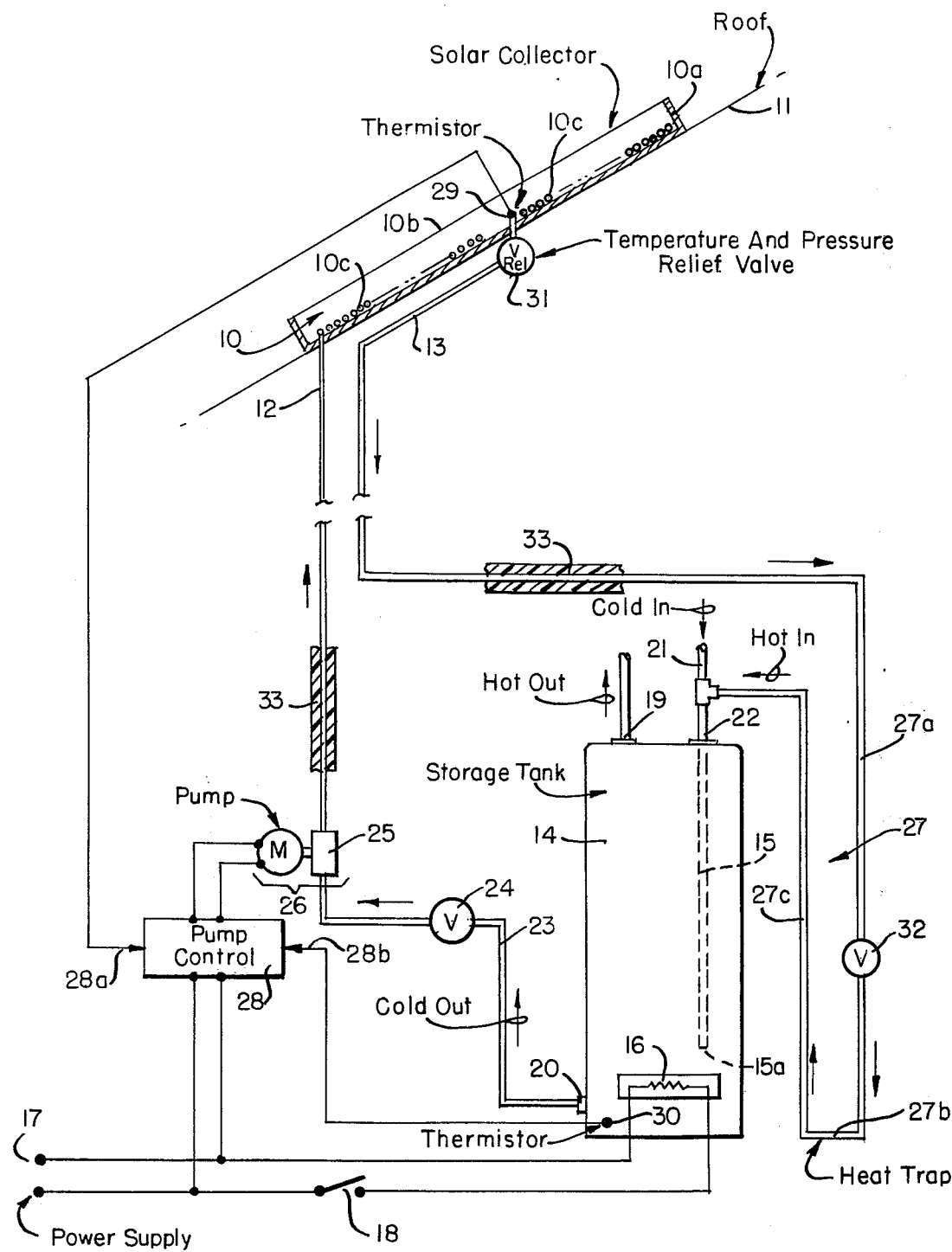

CLOSED SYSTEM SOLAR HEATER

BACKGROUND OF THE INVENTION

Various forms of solar heating arrangements have been suggested heretofore in an effort to use energy from the sun as a source of heat. In its simplest form, such an arrangement constitutes the judicious disposition and orientation of transparent surfaces arranged to admit electromagnetic radiation emanating from the sun to an interior region which, preferably, includes an appropriate medium responsive to such radiation. The medium typically employed heretofore has been water which functions to absorb solar heat, and the water is caused to flow through an appropriate path subject to solar radiation, or to heat from such radiation, so that heat absorbed in the water can be extracted therefrom for utilization as desired. In some cases, the water flow path is defined by a continuous length of tubing which is coiled in various appropriate configurations, e.g. as shown in Gould U.S. Pat. No. 1,747,826, Trombe U.S. Pat. No. 2,552,237, Fox U.S. Pat. No. 2,978,562, Garrett U.S. Pat. No. 3,200,820, Thomason U.S. Pat. No. 3,215,134, Thannhauser U.S. Pat. No. 3,254,644, and Long U.S. Pat. No. 3,778,578; and, in some cases, it has been suggested that such solar heating coils should be associated with an appropriate storage tank, e.g. as in the aforementioned prior art Gould patent, to provide a more convenient supply of heated water for utilization in a home or the like.

Even though systems of the type contemplated by the aforementioned Gould patent have been known in the art for at least 45 years, they have not found any general acceptance, possibly because systems of the type suggested heretofore have been comparatively inefficient. More particularly, even in those cases where the solar collector design has operated in adequate fashion to heat a quantity of water, the temperature to which the water is heated and/or the quantity of water which is actually heated have not adequately supplied the needs of a typical home; and in those cases where attempts have been made to supplement the solar collector with a water storage tank to retain a somewhat larger supply of heated water, the overall system, rather than accomplishing the desired purpose, has actually proved to be detrimental to those purposes since the overall system has been subject to excessive heat loss during periods when solar radiation is not actually being received, e.g. during cool evenings or under inclement weather conditions.

The present invention, recognizing these disadvantages of the prior art, is concerned with an improved solar heating system which operates at negligible cost to provide a larger quantity of water, heated to a higher temperature, than has been possible heretofore and which functions to automatically maintain an appropriate supply of adequately heated water for utilization even under adverse ambient conditions.

SUMMARY OF THE INVENTION

The solar heating system of the present invention comprises a solar collector preferably consisting of a continuous length of copper tubing coiled into a substantially planar array of closely adjacent turns, associated with water lines arranged to supply water to the outermost turn of the array and to extract water from the array adjacent the innermost turn thereof. These lines are, in turn, associated with a hot water storage tank adapted to supply water to the solar collector and adapted to receive heated water therefrom for storage; and the water lines between the storage tank and solar collector are associated with a pump which is selectively actuated by a pump control system responsive to a predetermined difference in the temperatures of the water adjacent the bottom of the tank and adjacent the innermost coil of the helical array for selectively circulating water out of the storage tank through the array and then back to the storage tank for storage therein. The water pressure in the entire system, from the hot water storage tank to the solar collector, is maintained at a given fixed value, i.e. the arrangement constitutes a closed system.

In order to maximize the efficiency of the overall system, the arrangement incorporates a number of important features. Cold water furnished to the storage tank from an external supply is fed to the tank at a cold water inlet located adjacent the top of the tank, and the heated water supplied by the solar collector is fed to the tank through this same inlet adjacent the top of the tank, thereby to effect an improved mixing of the incoming hot water from the solar collector with water already in the tank. Hot water is extracted from the tank for utilization through an outlet disposed adjacent the top of the tank, and cold water is supplied to the solar collector from an outlet located adjacent the bottom of the tank. In order to assure that the incoming hot water from the solar collector cannot be immediately withdrawn either through the hot water outlet at the top of the tank, or through the cold water outlet at the bottom of the tank, the common water inlet adjacent the top of the tank is associated with a filler tube located within the tank and terminating on the tank interior at a location intermediate the tank cold water and hot water outlets. This dimensioning of the filler tube further assures an improved mixing of cold water and hot water within the tank.

The water line between the hot water outlet of the solar collector and the cold water inlet adjacent the top of the storage tank includes, moreover, a heat trap taking the form of a U-shaped line section which extends from the hot water solar collector outlet past the top of the tank on its exterior to a position substantially level with the bottom of the tank, and then extends vertically upward to the water inlet adjacent the top of the tank. The water at different levels in the heat trap adjacent the tank tends to assume the same temperatures as the corresponding levels of water within the tank itself and, since hot water cannot flow downward, hot water is prevented from flowing out of the tank when the solar collector is cooler than the heated water within the tank. This extremely important feature of the invention assures that there is no loss of heat from the tank due to radiation or due to the natural rise of heated water during a cool evening or under inclement weather conditions, and accomplishes this heat retention without the need for solenoid valves, check valves, or other devices that would impede water flow and increase the cost of the overall system.

In a preferred embodiment of the invention, the tank includes an auxiliary heater, e.g. a resistance type electrical heater, which is normally de-energized. The auxiliary heater can, however, be energized under prolonged conditions of inclement weather, to supplement or replace the operation of the solar collector, thereby to insure a continuous supply of appropriately heated water.

The cost of operation of the overall system has been found to be comparatively negligible, being equivalent of the use of a 30 watt bulb during operating hours, and consuming a total energy of approximately 3.5 kw per month. In comparison, a standard hot water heater of the electric quick recovery type uses approximately 750 kw or more per month for the average family, i.e. the system of the present invention consumes approximately 1/200 the energy that a conventional water heater of equivalent capacity would consume. This, of course, results in considerable financial savings to individuals using the system, a saving in fuel purchase to the power company, and assures considerable conservation of fossil fuel resources while achieving, at the same time, a cleaner environment.

BRIEF DESCRIPTION OF THE DRAWINGS

The foregoing objects, advantages, construction and operation of the present invention will become more readily apparent from the subsequent description taken together with the single figure in the drawings which illustrates a solar water heating system constructed in accordance with the present invention.

DESCRIPTION OF THE PREFERRED EMBODIMENTS

In accordance with the present invention, a solar heater of the closed system type comprises a solar collector 10 which may be mounted on the roof 11 of a house, or at some other appropriate location, and which is operative to admit solar radiation to heat a supply of water. The solar collector 10 may take any of the various forms suggested by others heretofore but preferably comprises a solar collector of the general type described in Gould U.S. Pat. No. 1,747,826.

More particularly, the solar collector includes a housing 10a of generally rectangular configuration, having a width and depth of substantially 5 feet each and a height of approximately 4 inches, the housing 10a being preferably fabricated of an insulating material, e.g. fiberglass having a urethane base, and provided with one or more transparent panes 10b disposed in spaced substantially parallel relation to the bottom of the housing and in sealed relation to the sides of the housing to create a heat pocket within the housing immediately beneath transparent face 10b. The face or panes 10b are preferably fabricated of window glass having a low iron content since this type of glass captures the long rays of the light spectrum and tends to retain heat inasmuch as such long rays will not reflect back through the glass.

The interior of the solar collector comprises a continuous length of tubing which is coiled in a helical array 10c of closely adjacent contiguous turns disposed in a plane substantially parallel to the bottom of housing 10a. The helical array 10c and the entire interior of the housing 10a is preferably covered with black paint of high carbon content to maximize heat adsorption by the solar collector. The outermost turn of the helical array 10c communicates with a water inlet line 12 while the innermost turn of the array communicates with a water outlet line 13. Water fed into the array via inlet line 12 thus flows from the exterior to the interior turns of the array and preferably exits under the helix to a point near the point of original entry. While outlet line 13 is illustrated in the figure as being disposed below the bottom of housing 10a, in a preferred form of the invention it is preferably disposed within the housing immediately below the array 10c so that the inlet line 12 and outlet line 13 pass through the housing walls at points closely adjacent to one another near one of the upstanding sides of the housing 10a.

The actual quantity of water which passes through the array 10c, and the temperature to which it is heated, is dependent upon the dimensions of the tubing used in the helical array. If tubing of a single diameter is used throughout the array, an increase in the diameter of the tubing achieves a greater quantity of water flow through the array, but effects less heat per unit volume of flow. Conversely, a decrease in the diameter of the tubing, when uniform diameter tubing is used throughout, decreases the quantity of flow but increases the temperature to which water is heated and, indeed, a reduction in the diameter of the tubing can be such that the solar collector produces sufficient heat to convert the flowing water to steam which, in a water heating application of the type contemplated by the present invention, is undesirable. In a preferred embodiment of the invention, the helical array 10c comprises two concentric helical arrays of copper tubing, interconnected to one another to provide a continuous flow path, and having different lengths and diameters respectively to provide a compromise between the quantity flow and temperature considerations discussed above. More particularly, the helical array 10c may comprise substantially 250 feet of ½ inch diameter copper tubing forming the outer turns of the array, connected in continuous flow sequence to approximately 150 feet of ⅜ inch diameter tubing forming the inner turns of the array, and due to the differing diameters of the two portions of the array, the overall helix exhibits two elevations, i.e. an elevation of substantially ½ inch adjacent the said outer turns, and an elevation of substantially ⅜ inch adjacent the inner turns. The copper tubing is coiled so that each turn is in full engagement with the adjacent turns to cause the tubing itself to act as an absorption plate, thereby eliminating need for an additional absorption plate which has been commonly employed heretofore.

It has been found in practice that a solar collector having the dimensional considerations discussed herein for the helical array is capable of producing substantially 15–20 gallons per hour of water heated to substantially 170° F.

The solar collector 10 is associated with an insulated hot water storage tank 14 disposed at an appropriate location within the residence, preferably at a position significantly below the solar collector 10. Storage tank 14 may comprise the conventional hot water tank already located in a residence, having a filler tube 15 therein and an associated electrical heater 16 adapted to be energized from the home power supply 17. When such a standard hot water heater is used for storage purposes, a switch 18 is preferably placed in series with heater 16 so that said heater 16 is normally de-energized but can, by closure of switch 18, be energized to supplement or replace the hot water heating effects of solar collector 10 under prolonged condition of inclement weather. In addition, the filler tube 15 in such a pre-existing storage tank 14 is cut short at its bottom within the tank so that the outlet 15a of the filler tube is positioned at an intermediate position in the tank, below the hot water outlet 19 which is located adjacent the top of the tank and above the bibdrain 20 at the bottom of the tank. These same considerations apply, of course, in the event that the tank 14 and its associated parts are especially made for use in the solar heating system of the present invention.

Cold water is supplied to tank 14 from an external supply line 21 which is connected to tank inlet 22 communicating with filler tube 15. Cold water within the tank is in turn taken from tank outlet 20 adjacent the bottom of the tank and fed through a line 23 past an opened shut-off valve 24 by the impeller 25 of a pump 26 when the pump motor M is energized. Such cold water is then fed to inlet line 12 of solar collector 10, forcing heated water out of the collector via outlet line 13 through a heat trap 27 (to be described) to a tee coupled to cold water inlet line 21 to cause the hot water to also enter through the cold water inlet 22 of tank 14. The heated water so entering tank 14 is thoroughly mixed with the cold water in the tank due to the fact that the cold water and heated water are admitted through the same tank inlet to the same interior point in the tank, and the heated water tends to rise to the top of tank 14 where it may be withdrawn as needed via hot water outlet 19.

Pump 26 is normally de-energized but may be selectively energized by pump control 28 which is coupled to power supply 17 and which operates, under the control of signals supplied to input lines 28a and 28b to provide energization to pump motor M. Line 28a is coupled to a thermistor 29 mounted adjacent the innermost turns of helical array 10c to provide a signal input to pump control 28 related to the temperature of the heated water in solar collector 10. Input 28b is coupled to a thermistor 30 located on the outside of tank 14 near its bottom, or in the cold water outlet line therefrom, to provide a further input signal related to the temperature of the cold water at the bottom of tank 14. Pump control 28 is responsive to the difference in the temperatures being monitored by thermistors 29 and 30 and operates to energize pump 26 when the water in the solar collector is hotter than that at the bottom of the storage tank by a predetermined quantity, e.g. 5° or 10° F. When such a temperature difference is detected, energization of pump motor M drives impeller 25 to pump water from the bottom of tank 14 through lines 23, 12 into the outermost turns of helical array 10c, to force hot water from the innermost turns of said helical array via line 23 and heat trap 27 into the cold water inlet of tank 14.

Outlet line 13 includes a temperature and pressure relief valve 31 which is set to open at predetermined parameter values such as 150 psi and 210° F, and line 13 preferably also includes an additional shut-off valve 32 having a structure and function similar to that of valve 24.

In order to avoid undesirable loss of heat, all of the water lines to and from solar collector 10 and tank 14 are insulated throughout their length as represented diagramatically at 33. In addition, outlet line 13 leading from solar collector 10 to the cold water input of tank 14 includes the aforementioned heat trap 27 comprising an elongated line section 27a passing vertically from the solar collector 10 past the top of tank 14 to a line section 27b located at a level corresponding to the bottom of the tank, and then extending vertically upward as at 27c to the cold water inlet at the top of the tank. This U-shaped line section prevents heat dissipation from the heated water within tank 14 when solar collector 10 is not operating, e.g. at night or in inclement weather, ensures against the loss of heat due to radiation or the natural rise of heat under such conditions, and accomplishes these purposes without the provision of solenoid valves, check valves, or other devices which would increase the cost of the overall system and which would have the disadvantage of impeding water flow.

It will be appreciated that hot water rises to the top of tank 14. If the heat trap 27 were not provided, and line 13 from the solar collector extended directly to cold water inlet 22 of the tank, then when the coil 10c in the solar collector cooled, the hot water located adjacent the top of the tank would tend to rise through line 13 to the coil 10c, and the heat in the water would be dissipated by radiation from coil 10c. By using the heat trap 27, however, the water standing in vertical lines 27a and 27c tends to assume the same temperatures at various levels as are exhibited by the corresponding levels of the water within the tank itself, i.e. the water adjacent line section 27b will have a temperature corresponding to the temperature of the cold water near the bottom of tank 14, whereas the water in lines 27a and 27c at levels adjacent the top of the tank will have temperatures corresponding to the heated water near the top of the tank. These temperature gradients within the legs of U-shaped heat trap 27 prevent hot water located near the top of the tank from flowing out of the tank to solar collector 10, even though the temperature of solar collector 10 is significantly lower than that of the water within the tank 14.

When the solar collector is operating, hot water forced therefrom by activation of pump 26 enters tank 14 through the same inlet as is employed for the admission of cold water to said tank, and since the cold water and hot water are both admitted to the tank at the same entry point, a very excellent mixing of the incoming hot water with water pre-existing in the tank takes place. In addition, since the outlet 15a of filler tube 15 is located above cold water outlet 20 and below hot water outlet 19, hot water is supplied from the solar collector to tank 14 with the assurance that it cannot be immediately withdrawn from the tank either through the hot water outlet adjacent the top of the tank, or through the cold water outlet adjacent the bottom of the tank, to enhance the desired mixing effect. These features, taken together with the heat trap described above, assure that an adequate supply of hot water is always present in the tank so long as solar collector 10 is operating in its desired fashion and/or when auxiliary heater 16 is energized While I have thus described a preferred embodiment of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described my invention I claim:

1. A solar heating system comprising a solar collector constructed to receive solar radiation and having a water inlet for admitting water to said collector to be heated by said solar radiation, said solar collector including a hot water outlet for the egress of heated water from said collector, a water storage tank, supply means for supplying compratively cold water to said tank at a cold water inlet adjacent the top of said tank, a cold water outlet from said tank located adjacent the bottom of said tank, a first water line connecting said cold water outlet of said tank to said water inlet of said solar collector, a second water line connecting said hot water outlet of said solar collector to said cold water inlet of said tank, said second water line including a heat trap comprising a substantially U-shaped water line section external of said tank extending from said solar collector hot water outlet vertically downward past the top of said tank to a position adjacent the bottom of said tank and then vertically upward to said cold water inlet of said tank adjacent the top of said tank, and a hot water outlet adjacent the top of said tank for extracting heated water from said tank for utilization.

2. The structure of claim 1 wherein said storage tank includes an internal filler tube extending vertically from the water inlet adjacent the top of said tank toward the bottom of said tank, said filler tube opening into said tank at a position vertically above the cold water outlet of said tank and vertically below the hot water outlet of said tank whereby water from said supply means and hot water from said solar collector are each admitted to the interior of said tank at a common interior tank location disposed between said cold and hot water tank outlets.

3. The structure of claim 2 wherein said solar collector comprises a sealed housing, a continuous length of tubing coiled in a substantially coplanar helical array of closely adjacent turns within said housing, one face of said housing being transparent to admit solar radiation to the interior of said housing, the plane of said helical tubing array being disposed substantially parallel to said transparent housing face.

4. The structure of claim 3 wherein said solar collector water inlet is connected to the outermost turn of said helical array, said solar collector water outlet being connected to the innermost turn of said helical array.

5. The structure of claim 4 wherein said solar collector is positioned above the top of said storage tank.

6. The structure of claim 5 including a pump coupled to one of said water lines for circulating water from said tank through said helical array back to said tank, and control means for selectively activating said pump.

7. The structure of claim 6 wherein said pump is coupled to said first water line.

8. The structure of claim 6 wherein said control means includes means responsive to the temperature of the water in said solar collector.

9. The structure of claim 6 wherein said control means comprises means for monitoring the temperature of the water adjacent the bottom of said storage tank, means for monitoring the temperature of the water in said solar collector adjacent the innermost turns of said helical array, and means responsive to a predetermined difference between said two temperatures for activating said pump.

10. The structure of claim 1 wherein said storage tank includes a normally de-energized electrical heater, and means for selectively energizing said heater to supplement the water heating operating of said solar collector.

* * * * *